UNITED STATES PATENT OFFICE.

HENRY HOWARD, OF BROOKLINE, MASSACHUSETTS.

METHOD OF MAKING FORMATES AND FORMIC ACID.

970,825.      Specification of Letters Patent.    Patented Sept. 20, 1910.

No Drawing. Application filed June 10, 1908, Serial No. 437,676. Renewed August 8, 1910. Serial No. 576,077.

*To all whom it may concern:*

Be it known that I, HENRY HOWARD, a citizen of the United States, residing at Brookline, in the county of Suffolk and State of Massachusetts, have invented certain new and useful Improvements in Methods of Making Formates and Formic Acid, of which the following is a specification.

In the manufacture of sodium formate by reaction between caustic soda and carbon monoxid, it has been heretofore proposed to mix with the caustic soda an inert material such as charcoal, coke or lime, with the object of increasing the surface exposed to the gas. This result is accomplished in two ways; in the first place the melting point of the mixture is higher than the melting point of pure sodium hydroxid, thus permitting the mass to be maintained in a pulverulent state under the conditions of temperature existing during the absorption of carbon monoxid; and in the second place, an increased surface is exposed due simply to the increase in bulk of the mass after addition of the inert filler. The above materials are however highly objectionable in practice, as they contaminate and interfere with the usefulness of the sodium sulfate which remains as a by-product in the treatment of the formate with sulfuric acid for the production of formic acid.

According to the present invention I use as a filling material or inert body to be mixed with caustic alkali which is to be converted into formate, the alkali metal salt which will constitute the residue of the operation or the solid final product thereof, such salt possessing the advantage that it serves effectively during the operation to increase the surface exposed to the gas and does not introduce an impurity into the final product.

In practicing the invention, sodium sulfate may be mixed with or incorporated in the caustic alkali in any approved manner. For instance caustic soda and sodium sulfate in proper proportions may be ground together in a mill, or the finely ground compounds may be intimately mixed in any appropriate apparatus: or caustic soda and sodium sulfate may be mixed in solution or in presence of water and the mass dried by evaporation; or the caustic soda may be melted, the sodium sulfate incorporated by stirring, and the mass permitted to solidify. The resulting mass is subjected to the action of carbon monoxid at suitable temperatures and pressures as is well understood in the art for the production of sodium formate which is thereafter decomposed by means of sulfuric acid, leaving a residue consisting entirely of sodium sulfate. Portions of this residue may be mixed with caustic soda for the further practice of the method.

Instead of using sodium sulfate I may employ an alkali metal chlorid in case hydrochloric acid is to be used to decompose the formate. Or the formate may be decomposed by phosphoric acid, yielding sodium phosphate, in which case sodium phosphate in solid form is employed as the inert body or filler for the caustic alkali. Similarly other alkali metal salts may be employed, the formate being subsequently decomposed by the acid which enters into the constitution of the salt used, whereby a residual product consisting of a single salt in marketable form is produced.

I claim:

1. The method of making formic acid which consists in mixing an alkali metal hydroxid with the alkali metal salt which is to constitute the solid residue of the operation, subjecting the mixture to the action of carbon monoxid under suitable conditions to produce formate, and decomposing the formate by the acid which enters into the constitution of the alkali metal salt mixed with the hydroxid.

2. The method of making formates which consists in mixing an alkali metal hydroxid and sulfate, and subjecting the mixture to the action of carbon monoxid under suitable conditions to produce formate.

3. The method of making sodium formate which consists in mixing caustic soda and sodium sulfate, and subjecting the mixture to the action of carbon monoxid under suitable conditions to produce sodium formate.

4. The method of making formic acid and sodium sulfate which consists in mixing an alkali metal hydroxid and sulfate, subjecting the mixture to the action of carbon monoxid under suitable conditions to produce formate, and decomposing the formate by sulfuric acid.

In testimony whereof, I affix my signature in presence of two witnesses.

HENRY HOWARD.

Witnesses:
    ALBERT CHAMPION GILBERT,
    ROBERT JOSHUA KING.